United States Patent
Brunheim et al.

(10) Patent No.: US 6,577,572 B2
(45) Date of Patent: *Jun. 10, 2003

(54) APPARATUS FOR REPRODUCTION OR RECORDING DATA OR INFORMATION WITH A PHOTODETECTOR AND DIGITAL ERROR SIGNAL AND EVALUATION SIGNAL PROCESSING

(75) Inventors: Rüdiger Brunheim, Unterkirnach (DE); Michael Grimm, Villingen-Schwenningen (DE); Steffen Lehr, Villingen-Schwenningen (DE); Heinrich Schemmann, Villingen-Schwenningen (DE)

(73) Assignee: Thomson Licensing, S.A., Boulogne-Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/321,081

(22) Filed: May 27, 1999

(65) Prior Publication Data

US 2003/0007439 A1 Jan. 9, 2003

(30) Foreign Application Priority Data

May 29, 1998 (DE) .......................................... 198 24 056

(51) Int. Cl.⁷ ................................................. G11B 3/90
(52) U.S. Cl. ................................................... 369/53.31
(58) Field of Search ........................... 369/47.15, 47.16, 369/47.2, 47.23, 53.31

(56) References Cited

U.S. PATENT DOCUMENTS 5,673,046 A   9/1997   Hirajima et al.
5,675,569 A   10/1997  Yamaguchi et al.

FOREIGN PATENT DOCUMENTS

| DE | 19546951 | 6/1996 |
| EP | 0 390 977 A2 | 10/1990 |
| EP | 0 390977 A3 | 10/1990 |
| EP | 0724256 A2 | 7/1996 |
| EP | 0840297 A2 | 5/1998 |

OTHER PUBLICATIONS

Copy of European Search Report citing the above–listed documents AA, AM, & AN.
Uekawa, Yutaka, et al.: The development of digital servo algorithms for optical disc players; IEEE Transactions on Consumer Electronics, vol. 36, No. 3, Aug. 1990, pp. 567–571.
Copy of German Search Report citing the above–listed documents AA, AM, AN & AO.

*Primary Examiner*—Paul W. Huber
(74) *Attorney, Agent, or Firm*—Joseph S. Tripoli; Reitseng Lin

(57) ABSTRACT

The invention relates to an apparatus for the reproduction or recording of data or information with a photodetector and digital error signal and evaluation signal processing.

The object of the invention is to provide an apparatus for the reproduction or recording of data or information which requires little outlay despite digital evaluation signal processing and a considerable capability of adaptation to different scanning speeds. The invention is based on the principle of enabling digital evaluation signal generation with an analog-to-digital converter known from audio technology, even though the data rate of the data or high-frequency signal requires an analog-to-digital converter for the radio-frequency or for the video signal band. An analog-to-digital converter for the audio frequency band can be used to generate a digital evaluation signal by the analog-to-digital converter having fed to it not the high-frequency signal directly but rather at least one envelope of the high-frequency signal. An envelope detector is also proposed, which envelope detector is advantageously suitable both for the purpose of providing an upper envelope and for the purpose of providing a lower envelope.

The invention can preferably be used in apparatuses for the reproduction or recording of data or information with a photodetector and digital error signal and evaluation signal processing by means of which data or information are read from the data tracks of a recording medium or of different recording media or are recorded in tracks.

14 Claims, 7 Drawing Sheets

APPARATUS FOR REPRODUCTION OR RECORDING DATA OR INFORMATION WITH A PHOTODETECTOR AND DIGITAL ERROR SIGNAL AND EVALUATION SIGNAL PROCESSING

FIELD OF THE INVENTION

The invention relates to an apparatus for the reproduction or recording of data or information with a photodetector and digital error signal and evaluation signal processing which, using an optical scanning device, reads data or information from the data tracks of a recording medium or records data or information in tracks of a recording medium, the procedure being that a light beam is focused onto the recording medium using a focus regulating circuit and is guided along the data tracks using a track regulating circuit and the light beam reflected from the recording medium is reflected onto a photodetector.

BACKGROUND OF THE INVENTION

In apparatuses for the reproduction or recording of data or information in which, using an optical scanning device, data or information are read from the data tracks of a recording medium or are recorded in tracks of a recording medium, a light or laser beam is focused onto the recording medium using a focus regulating circuit and is guided on the data tracks of the recording medium using a track regulating circuit. The optical scanning device of apparatuses of this type, such as e.g. a CD player, DVD player, a magneto-optical apparatus for the reproduction or recording of data or information, a recording and reproduction apparatus for DRAW discs or a video disc player, has a laser diode, one or more lenses, a prism-type beam splitter, if appropriate a diffraction grating and a photodetector. The structure and function of an optical scanning device, a so-called optical pickup, are described in Electronic Components & Applications, Vol. 6, No. 4, 1984, on pages 209–215.

The light beam emitted by a laser diode is focused onto the recording medium by means of lenses and is reflected from the recording medium onto a photodetector. The data or information stored on the recording medium and the actual values or error signals for the focus and for the track regulating circuit are obtained from the output signals of the photodetector. It is already generally known to use digital servoprocessors for track and focus regulation. Since the error signals for the focus and track regulating circuit have a relatively low frequency in comparison with the data signal, analog-to-digital converters known from audio technology can be used for the analog-to-digital conversion of the error signals. The digital data signal is generated using a pulse shaper which detects the zero crossings of the analog high-frequency signal provided by the photodetector. Furthermore, so-called evaluation signals, such as, for example, the mirror signal and defect signal, are derived from the high-frequency signal provided by the photodetector, which evaluation signals, despite digital servoprocessors, are frequently generated using exclusively analog circuit means, since the digitization of the data or high-frequency signal requires a fast analog-to-digital converter of the kind used for video applications. The types of converter known from digital audio technology cannot be used if only because of the bandwidth of the high-frequency signal detected from a CD by the photodetector. This is cost-intensive and requires a high outlay in apparatuses having a multiple scanning speed, since the entire bandwidth of the high-frequency signal must be digitized. On the other hand, the information derived from the profile of the data signal or of the high-frequency signal has relatively high importance for identifying the cause of an abnormality in the high-frequency signal, which may be, by way of example, a track change or a defect, and is therefore indispensable for reliable functioning of a reproduction or recording apparatus. By way of example, the mirror signal is required in order to be able to distinguish whether the scanning beam is situated on or between the data tracks, since the track error signal is equal to zero in both cases.

Consequently, the advantages of digital evaluation signal processing are offset by the high costs for an analog-to-digital converter for the radio-frequency band or for video applications.

SUMMARY OF THE INVENTION

The object of the invention is to provide an apparatus for the reproduction or recording of data or information which requires little outlay despite digital evaluation signal processing and a considerable capability of adaptation to different scanning speeds.

This object is achieved by means of the features specified in independent claims. Advantageous designs and developments are specified in dependent claims.

A first aspect of the invention is that of enabling digital evaluation signal generation with an analog-to-digital converter known from audio technology, even though the data rate of the data or high-frequency signal requires an analog-to-digital converter for the radio-frequency band or for the video signal band.

Analog-to-digital converters for the audio frequency band require a comparatively lower outlay. However, the types of converter known from digital audio technology cannot be used because of the bandwidth of the high-frequency signal detected from a CD by the photodetector even with a single scanning speed. An analog-to-digital converter for the audio frequency band can nevertheless be used to generate a digital evaluation signal by the analog-to-digital converter having fed to it not the high-frequency signal directly but rather at least one envelope of the high-frequency signal. Since the envelope signal has a significantly smaller bandwidth than the high-frequency signal, an analog-to-digital converter known from audio technology can be used for the purpose of digital evaluation signal generation and the advantages of digital evaluation signal processing can nevertheless be utilized. What is involved, then, is an advantageous hybrid solution comprising an analog preamplifier, an analog-to-digital converter for the audio frequency band and a digital processor.

A further aspect of the invention is that of using just one analog-to-digital converter in connection with the digital signal processor of an apparatus for the reproduction or recording of data or information with a photodetector and digital error signal and evaluation signal processing. For this purpose, both error signals and at least one envelope signal of the high-frequency signal detected from the recording medium are fed to an analog-to-digital converter for the video signal band via a multiplexer. In this case, the analog envelope detector preferably has a time constant matched to the lowest high frequency of the data signal detected by the photodetector. The frequency of the data or high-frequency signal detected by the photodetector is, as a rule, higher than that of the information signal since the data signal detected by the photodetector contains additional details concerning location, length or content of the information signal, which are separated out in further signal processing stages. Despite the analog preprocessing of the data signal to form an envelope signal, the variable parameters of one or more evaluation signals, such as, by way of example, of the mirror or defect signal, are adjusted in the digital domain and, as a rule, in an automated manner. This results in a high level of flexibility with regard to the capability of utilizing the apparatus for different recording media and scanning speeds. The invention is based on the principle of using exclusively analog signals of low frequency despite the digital signal processing of all the servosignals including mirror and defect signals, with the result that a narrow-band analog-to-digital converter or an analog-to-digital converter for the video frequency band can be used, all the signals which are necessary for digital error and evaluation signal generation being fed to the said converter via a multiplexer. Digital evaluation or signal processing of the high-frequency data signal in order, by way of example, to be able to distinguish between defects and track change, to adjust the gain in servocontrol loops, to mark incorrect data signals or to count correctly the number of tracks crossed is made possible by virtue of the fact that at least one envelope signal derived from the high-frequency data signal is actually formed prior to the digitization. However, the evaluation of the envelope signal is provided in the digital domain in order to ensure high accuracy and flexibility. Although the data rate, referred to as input frequency here, of a reproduction or recording apparatus for different optical recording media which is detected by the photodetector of the apparatus has a large bandwidth, the control and signal processing are carried out with narrow-band signals. The data or high-frequency signal detected from the recording medium by the photodetector is digitized only in respect of its envelope for the purpose of forming evaluation signals. The envelope signal is formed from the data or high-frequency signal using an analog circuit comprising, by way of example, a rectifier and a capacitor which is charged and discharged in a defined manner. In principle, the proposed apparatus for the reproduction or recording of data, which apparatus requires little outlay despite digital evaluation signal processing, is independent of the way in which the envelope signal is generated.

Nevertheless, two circuit arrangements are specified which can be used for the purpose of envelope signal generation in an advantageous manner.

A first circuit arrangement is proposed, which enables both an upper and a lower envelope of a high-frequency signal to be detected. It is provided particularly when the upper and lower envelope signals cannot be subjected to further processing simultaneously but rather successively. The principle behind the first circuit arrangement for envelope signal generation consists in using the high-frequency signal that is detected to drive an integrator stage via a charge or discharge circuit, which integrator stage is preferably formed by two transistors, a capacitor and a current source, the control transistor of which is connected to a base current compensation circuit. The envelope signal formed by means of the integrator stage is coupled out by means of an emitter follower and simultaneously used as a comparison signal in the charge or discharge circuit. In order to form the upper or lower envelope, the input and the output of the integrated stage are optionally connected to a charge or discharge circuit for the upper or lower envelope. This means, advantageously, that only one integrator stage is required to form the upper and lower envelopes, which integrator stage is used multiply.

In order to provide the upper and lower envelope signals simultaneously, a second circuit arrangement is proposed, which differs from the first circuit arrangement only by the fact that a second integrator stage is provided, with the result that both the upper and the lower envelope signal are constantly available simultaneously. Despite different input frequencies, governed by the type of recording medium and its playback speed, it is possible to use a uniform time constant in connection with the formation of the envelope signal. Deviations from an ideal envelope which is matched exactly to the input frequency can be taken into account during the evaluation of the said envelope in the digital domain. Since all that is involved is the selection of a time constant for the envelope detector and the signal need not be evaluated in the analog domain, it is possible, likewise with little outlay, to provide an envelope detector whose different time constants are set by the digital processor via an IIC bus, by way of example.

The digital signal processing of the error and evaluation signals in a processor connected to the analog-to-digital converter is not discussed specifically at this point since solutions are already known in this respect and the invention is independent of the kind of digital signal processing downstream. All the signals which are necessary for digital error signal and evaluation signal processing are available to a processor after the analog-to-digital conversion of the error and envelope signals.

BRIEF DESCRIPTION OF THE DRAWINGS

The invention is explained in more detail below with reference to drawings, in which.

DETAILED DESCRIPTION OF THE PREFERRED EMBODIMENTS

Figure 1:
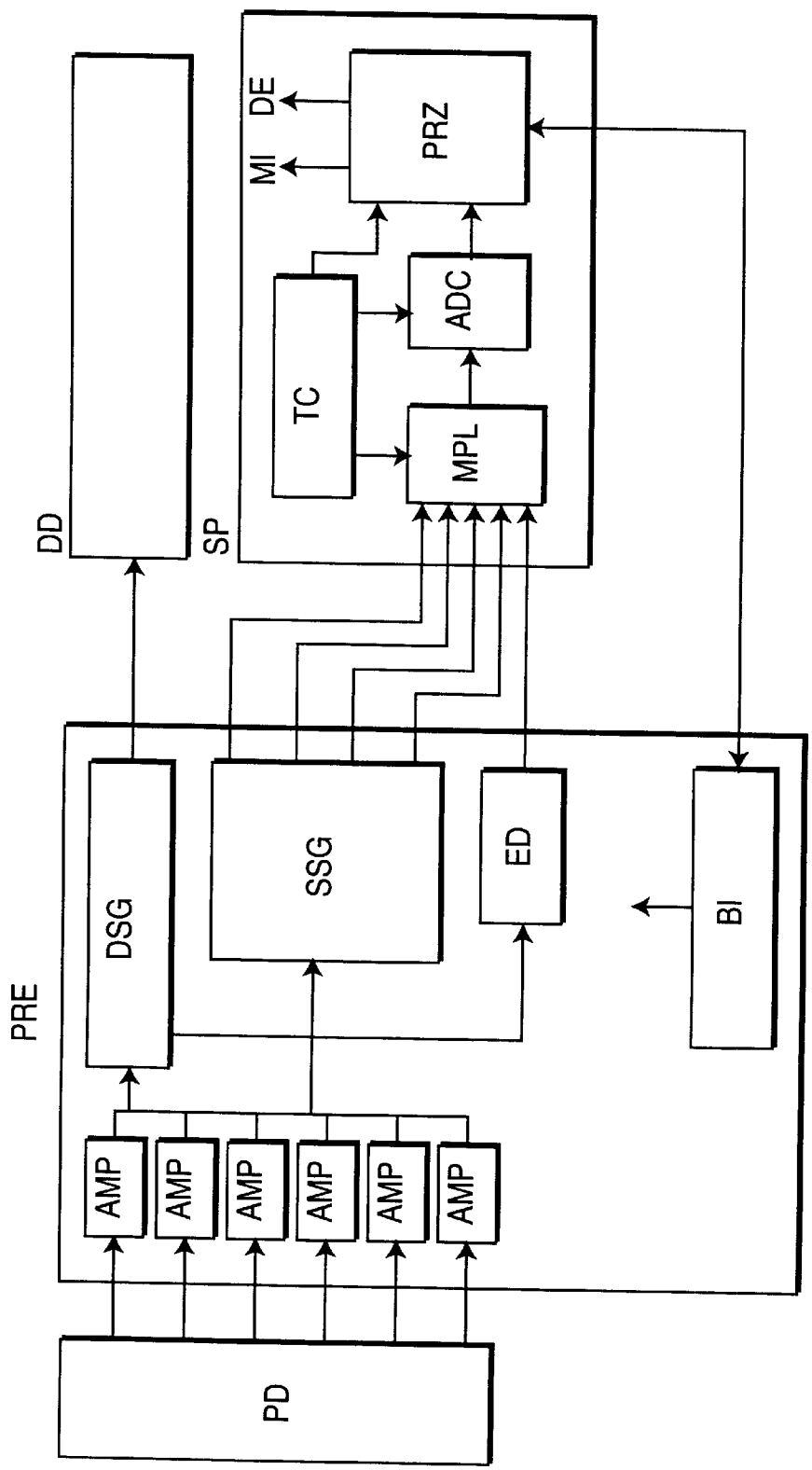
FIG. 1 shows a block diagram of the input circuit of a DVD player.

The block diagram of the input circuit of a DVD player as illustrated in FIG. 1 contains a photodetector PD, an analog preamplifier unit PRE, a data decoder DD and a servoprocessor SP. The abbreviation DVD stands for Digital Versatile Disc and DVD players are generally provided for the playback or else for the recording of data or information with a varying scanning speed.

The analog preamplifier unit PRE contains preamplifiers AMP, a data signal generation stage DSG, a servosignal generation stage SSG, an envelope detector ED and a bus interface BI, and the servoprocessor SP is provided with a multiplexer MPL, an analog-to-digital converter ADC, a timing control unit TC as well as a processor PRZ, which generates a mirror signal MI and a defect signal DE. Furthermore, the processor PRZ is connected to the bus interface BI of the analog preamplifier unit PRE via a serial bus.

Figure 5:
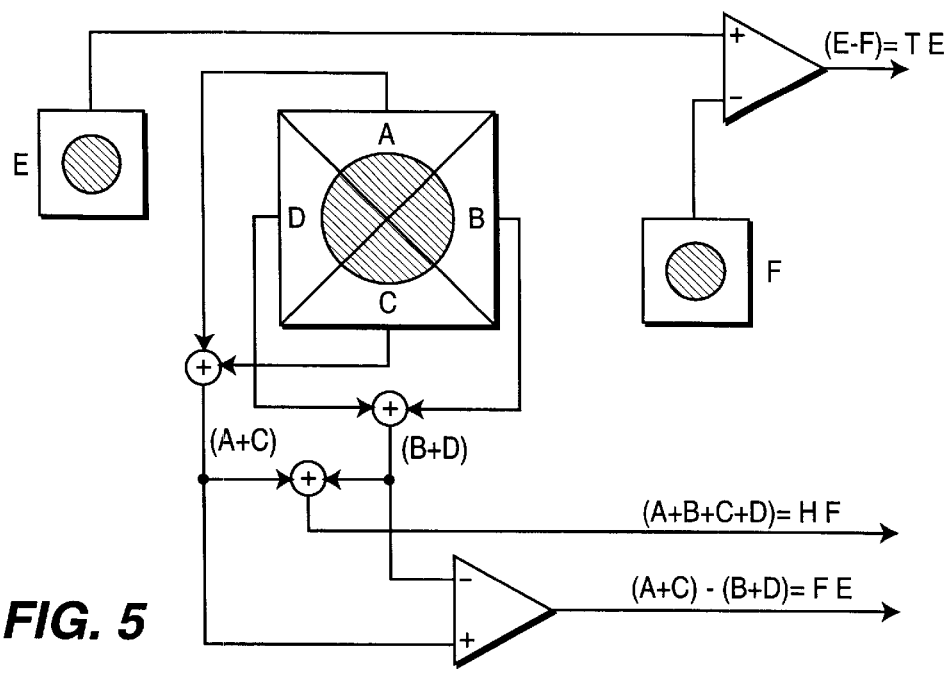
FIG. 5 shows a schematic sketch for signals provided by a photodetector.

The photodetector PD is constructed for example in a known manner in accordance with FIG. 5. It comprises four photodiodes A, B, C and D joined together to form a square. The light beam which is reflected from a recording medium and focused onto the four photodiodes A, B, C and D generates an analog data signal HF=A+B+C+D in the photodetector and a focus error signal FE is generated in a known manner from the difference between opposite pairs of photodiodes. In addition to the photodiodes A, B, C and D, photodiodes E, F are provided and are used to generate a track error signal TE in a known manner by the difference between their signals being formed. The track error signal TE and the focus error signal FE form two of the so-called servosignals. Further servosignals which, in accordance with FIG. 1, are generated in a servosignal generation stage SSG are a disc turntable motor signal, which determines the scanning speed of the recording medium, and the control signal for the coarse drive in the case of a tracking system comprising coarse drive and vernier drive. By way of example, the coarse drive is designed as a spindle by means of which the entire optical scanning device comprising, by way of example, the laser diode, lenses, a prism-type beam splitter, a diffraction grating and the photodetector, can be displaced radially. The vernier drive enables the light beam to be tilted e.g. through a predeterminable small angle in the radial direction, so that the light beam can be moved a short distance along a radius of the recording medium just by this tilting movement. In principle, however, other photodetectors which provide an analog data signal HF and corresponding error signals can also be used in connection with the invention.

The track error signal TE and focus error signal are not sufficient, however, for the functioning of an apparatus for the reproduction or recording of data with optical recording media, since, by way of example, the track error signal TE has the value zero when scanning is effected both on the data track and between the data tracks. An evaluation signal is necessary, therefore, which enables the apparatus to distinguish between scanning on and between the data tracks of the recording medium. The data signal HF generated by the photodetector PD is used for this purpose, which signal has a maximum when scanning is effected on the track and a minimum when scanning is effected between the data tracks. The amplitude of the high-frequency signal is at a maximum when the light beam radiates onto a data track but is at a minimum, on the other hand, when the light beam is situated between data tracks, that is to say on the so-called reflecting surface. Therefore, this evaluation signal is also referred to as mirror signal MI and is provided by the processor PRZ in accordance with FIG. 1.

Figure 6:
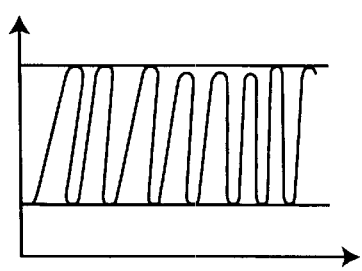
FIG. 6 shows a schematic sketch of the profile of a data signal HF that is not subjected to interference.
Figure 7:
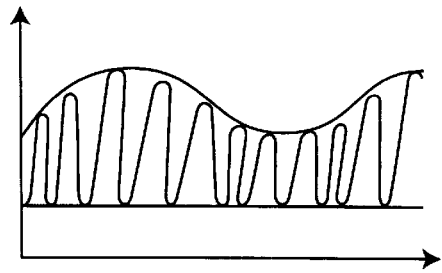
FIG. 7 shows a schematic sketch of the profile of a data signal HF that is not subjected to interference in the course of track jumping.
Figure 8:
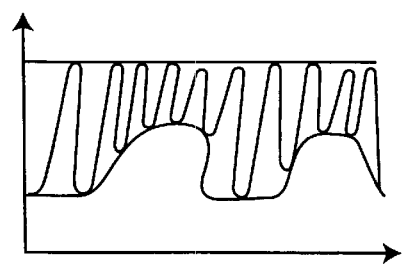
FIG. 8 shows a schematic sketch of the profile of a data signal HF which is subjected to interference due to contaminants or vibrations.

The evaluation signals that are frequently used—mirror signal MI and defect signal DE—are explained in more detail with reference to FIGS. 6 to 9. FIG. 6 illustrates the profile of the data signal HF under ideal conditions. The upper and lower envelopes are straight lines when the data signal HF is not influenced by dirt and scratches or by a track change of the recording medium. FIG. 7 shows the ideal profile of the data signal HF or of the envelope of the data signal HF in the course of track jumping. The lower envelope is once again a straight line; in contrast, the upper envelope exhibits a sinusoidal profile. The number of detected maxima corresponds to the number of tracks crossed. In FIG. 8, although the upper envelope forms a straight line, the lower envelope has irregular bulges which originate from contaminants or scratches on the CD disc or are caused by vibrations.

Figure 9:
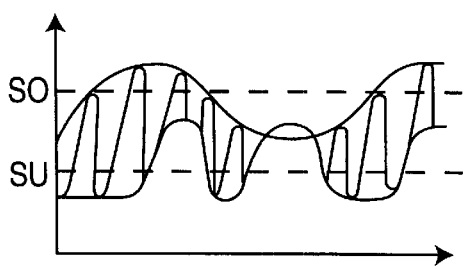
FIG. 9 shows a schematic sketch of the profile of a data signal HF which is subjected to interference due to contaminants or vibrations.

Finally, FIG. 9 shows a profile of the data signal HF when a reproduction apparatus is exposed to vibrations during a track change or the recording medium is damaged by scratches, dust, fingerprints or other soiling. The sinusoidal profile of the upper envelope may even be interrupted by the lower envelope, which has a similar profile to that in FIG. 8.

Figure 10:
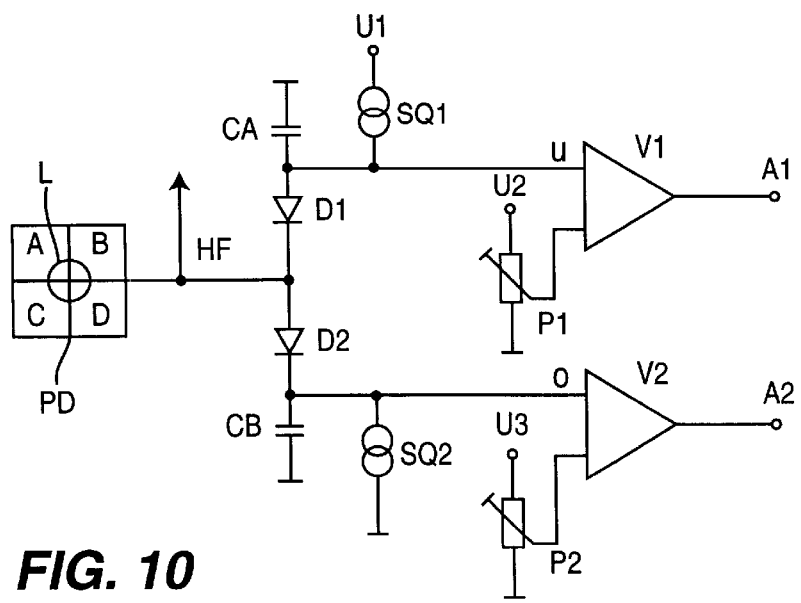
FIG. 10 shows a schematic sketch of a known circuit arrangement for analog evaluation signal provision.

FIG. 10 specifies an exemplary embodiment of a circuit arrangement which is used in analog technology and provides corresponding evaluation signals from the profile of the envelopes.

The light beam reflected from a recording medium is focused onto the photodetector PD, which is constructed from four square-shaped photodiodes A, B, C and D. The data signal HF which is generated by the photodetector PD and is equal to the sum of the photo voltages of the photodiodes A, B, C and D is forwarded to a circuit (not illustrated) in order to be decoded. In addition, the data signal HF is applied to the cathode of a diode D1, which is connected to the anode of a diode D2. The anode of the diode D1 is connected to one terminal of a capacitor CA, whose other terminal is at reference-earth potential, and to a pole of a current source SQ1, whose other pole has a voltage U1 applied to it, as well as to one input of a comparator V1, whose other input is connected to the tap of a potentiometer P1. A voltage U2 is applied to one terminal of the potentiometer P1, while the other terminal of the potentiometer P1 is at reference-earth potential. The cathode of the diode D2 is connected to one terminal of a capacitor CB, whose other terminal is at reference-earth potential, to one pole of a current source SQ2, whose other pole is likewise at reference-earth potential, and to one input of a comparator V2, whose other input is connected to a tap of a potentiometer P2. A voltage U3 is applied to one terminal of the potentiometer P2 and the other terminal is at reference-earth potential. With that part of the circuit arrangement illustrated in FIG. 10 which comprises the components D1, CA, SQ1, V1 and P1, the lower envelope u is compared with a lower threshold value SU illustrated by a dashed line in FIG. 9, and with the other part of the circuit arrangement in FIG. 10, which other part is formed by the components D2, CB, SQ2, V2 and P2, the upper envelope o is compared with the upper threshold value SO which is likewise illustrated by a dashed line in FIG. 9. The comparator V2 outputs a signal A2 at its output if the upper envelope o of the data signal HF falls below the upper threshold value SO. The signal at the output A indicates that the light beam is crossing tracks. On the other hand, the comparator V1 outputs a signal at its output A1 if the lower envelope of the data signal HF exceeds the lower threshold value SU. The signal at the output A1 indicates the presence of interference caused by dirt, fingerprints, scratches, etc., on the recording medium or by vibrations of the reproduction apparatus. Setting the potentiometers P1 and P2 defines the lower and upper threshold values SU and SO, respectively. By virtue of the fact that it can immediately be identified from the data signal HF whether the light beam is jumping across tracks, whether interference caused by vibrations or by dirt on the recording medium are present or whether both phenomena are present, it is possible, by way of example, for the focus and track regulating circuits to be influenced so that they regulate more rapidly or more accurately under these conditions. However, the circuit arrangement illustrated in FIG. 10 has the disadvantage that it is realized using analog technology and, as a result, also has the known disadvantages of this technology. By way of example, the complicated setting of the threshold values and the drift thereof as well as the matching of the parameters to different properties of recording media and different scanning speeds may be regarded as disadvantages of analog technology in an otherwise purely digital environment given the use of a digital servosignal processor. Analog circuits are very inflexible with regard to different recording and reproduction systems, such as DVD, CD, CD-ROM, writable CD, DVD and different speeds and the time constants associated therewith. On the other hand, the digitization of the data signal HF requires a high outlay since the large bandwidth and high frequency of the data signal HF make it necessary to provide an analog-to-digital converter of the kind used for video applications, for example. Since the error signals have a relatively narrowband nature and low frequency in comparison with the data signal HF, in principle an analog-to-digital converter of the kind used for audio applications is sufficient for driving a digital servosignal processor.

The contradiction resulting from this is resolved by virtue of the fact that the generation of one or both envelopes of the data signal HF is provided in the analog domain, but the evaluation of the envelopes is provided in the digital domain. The proportion of analog circuit elements is reduced and high flexibility for adapting to different conditions and a considerable cost saving are achieved in that only one narrow-band analog-to-digital converter is to be provided for one or more evaluation signals, despite digital evaluation signal processing. This advantageously opens up the possibility of providing an apparatus for the reproduction or recording of data with a servoprocessor SP which has just one analog-to-digital converter ADC, to which, in accordance with FIG. 1, both numerous error signals and the signals required for generating evaluation signals are fed via a multiplexer MPL. Signals required for generating evaluation signals are the upper and lower envelopes of the data signal HF which, in the analog domain, are indeed generated from the data signal HF but are not evaluated by a comparison with threshold values, for example. An envelope detector ED is provided for this purpose, which envelope detector is illustrated in FIG. 1 and is connected to a data signal generation stage DSG. In an analog preamplifier unit PRE, a data signal HF detected by a photodetector PD is fed to the data signal generation stage DSG via one or more preamplifiers AMP, at least some of which simultaneously provide signals for a servosignal generation stage SSG. The number of photodiodes forming the photodetector PD and the number of preamplifiers AMP depend on the scanning system used and are specified only by way of example here. Moreover, the bus interface BI illustrated in the analog preamplifier unit PRE is only necessary if, by way of example, different time constants of an analog phase detector are to be selected via the IIC bus of the processor PRZ. Furthermore, it is expedient if the servo and envelope signals are subjected to low-pass filtering before leaving the analog preamplifier unit PRE. A simple, known, active second-order filter can be used for this purpose, by way of example.

A data decoder DD is connected to the data signal generation stage DSG of the analog preamplifier unit PRE for the purpose of generating the digital data information and a timing control unit TC is provided in the servoprocessor SP for the purpose of controlling the temporal sequences.

Figure 2:
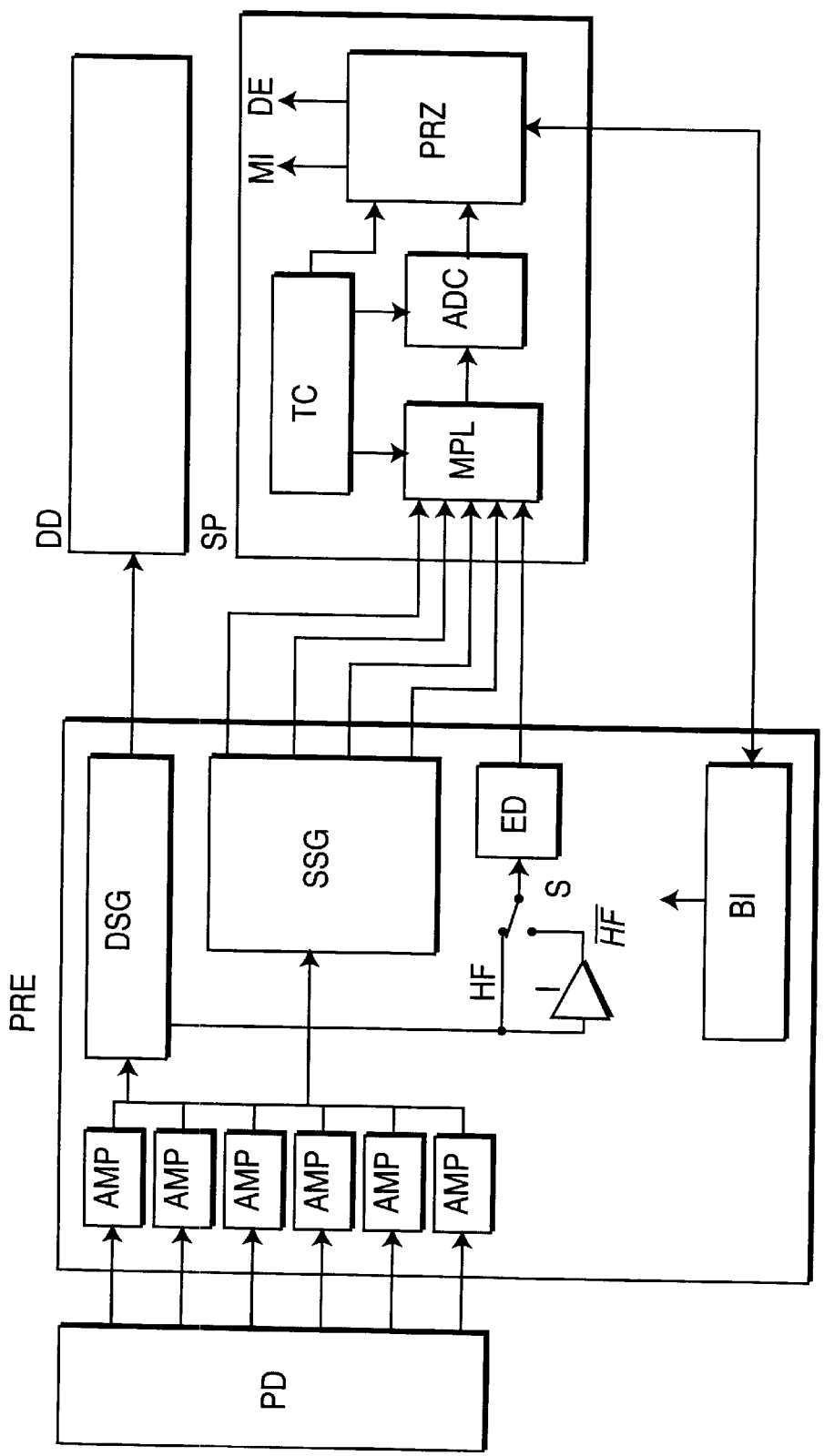
FIG. 2 shows a block diagram of an input circuit with an envelope selection means.

Since the upper envelope o and the lower envelope u are not required simultaneously, it is possible, as illustrated in FIG. 2, for one of the envelopes to be selected by optional inversion of the data signal HF. For this purpose, in accordance with FIG. 2, an inverter I is provided and a switch S is used to feed to the envelope detector ED either the data signal HF or the inverted data signal $\overline{HF}$ for the purpose of forming an upper envelope o and a lower envelope u. This means, advantageously, that just one envelope detector ED is necessary, both an upper envelope o and a lower envelope u of the data signal HF being formed by the said envelope detector. FIG. 2 is identical to FIG. 1 in respect of all the further component parts.

Figure 3:
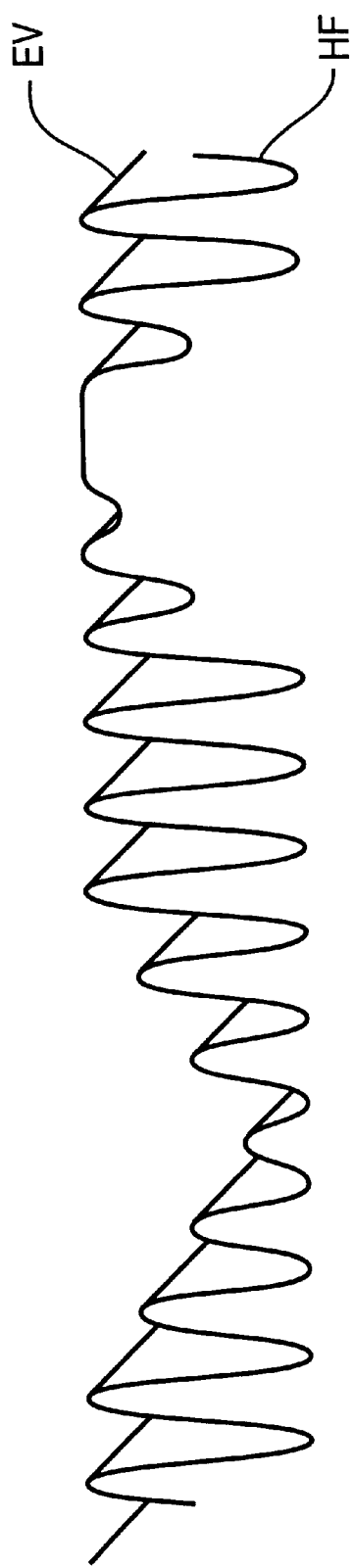
FIG. 3 shows a schematic sketch of a data signal HF with envelope EV.
Figure 4:
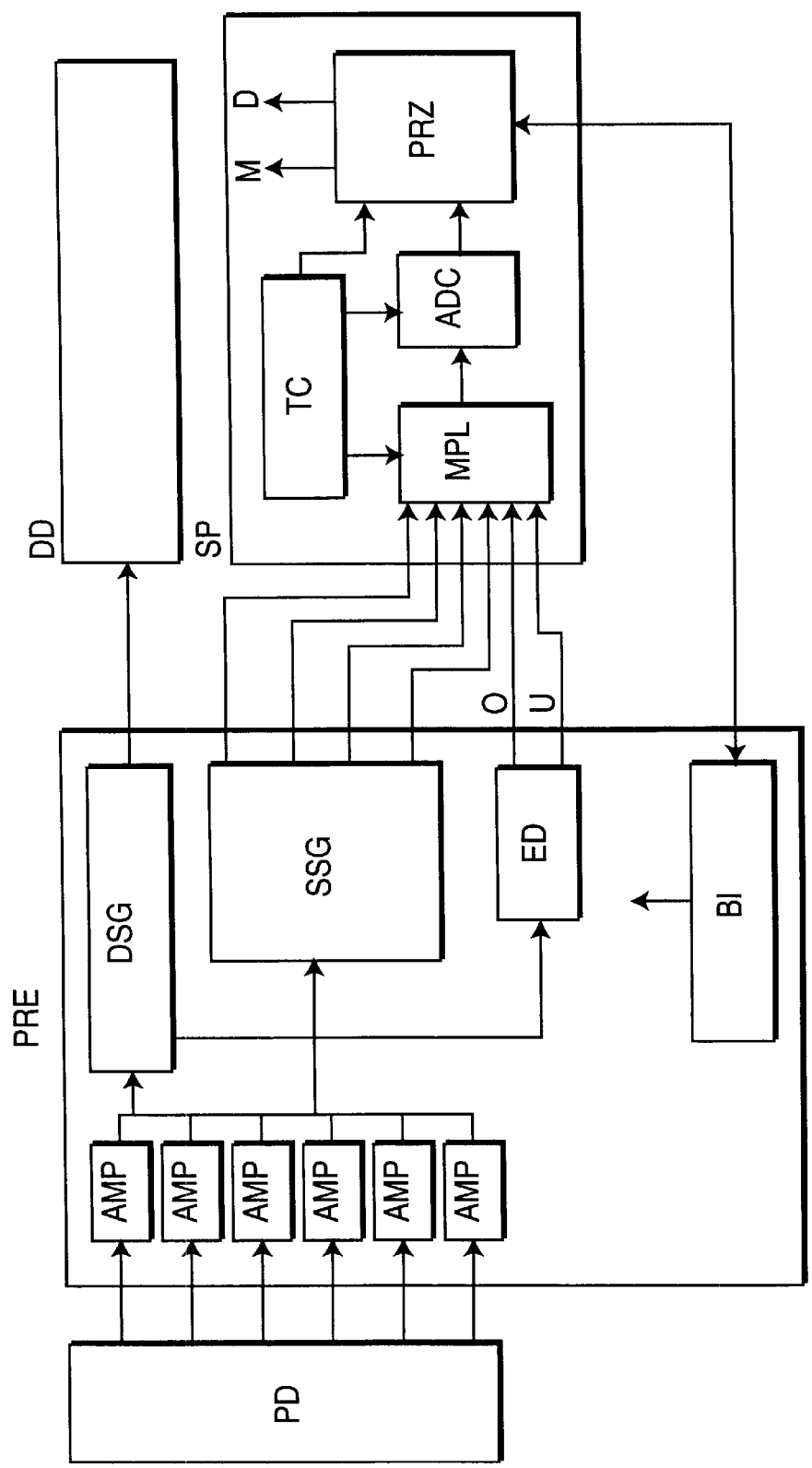
FIG. 4 shows a block diagram of an input circuit with an envelope generation means.

In principle, the envelope signal EV, as is illustrated by way of example in FIG. 3, has a significantly smaller bandwidth than the data signal HF and can therefore be digitized even using an inexpensive analog-to-digital converter ADC of the kind used for audio applications. In principle, the upper envelope o and the lower envelope u can also be fed simultaneously to the multiplexer MPL, as illustrated in FIG. 4.

Figure 11:
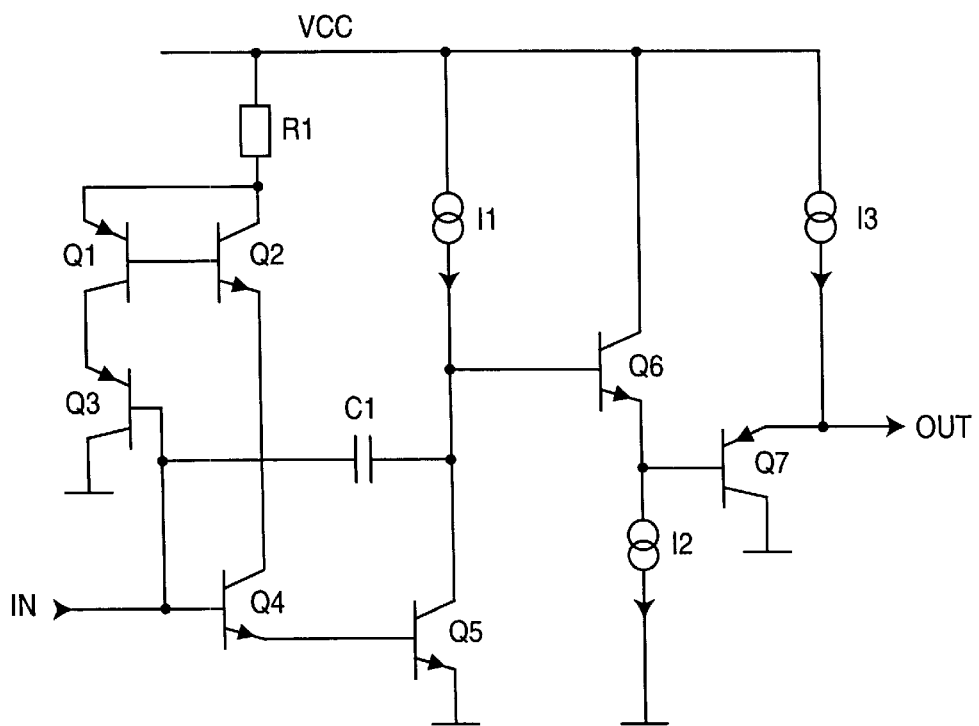
FIG. 11 shows a circuit arrangement for an envelope detector.

A circuit arrangement, the principle behind which is explained with reference to FIG. 11 is proposed as the envelope detector ED. Both an upper envelope and a lower envelope can be mapped using the circuit arrangement in accordance with FIG. 11. The task of the envelope detector ED is to form an envelope of a higher-frequency signal on which a low-frequency signal is superposed. In accordance with FIG. 11, two transistors Q4, Q5 together with a capacitor C1 and a current source I1 form an integrator stage which is driven by the input IN. The input IN is formed by the base of the first transistor Q4 and is connected to the capacitor C1, the other terminal of which is connected to the collector of the second transistor Q5 and to the first current source I1. The first current source I1 is connected to the supply voltage VCC and the emitter of the second transistor Q5 is connected to earth, while the base of the second transistor Q5 is connected to the emitter of the first transistor Q4. In order to avoid undesirable charging of the capacitor C1 by the base current of the first transistor Q4, a base current compensation circuit formed by three transistors Q1 . . . Q3 and a resistor R1 is provided, which resistor is connected, on the one hand, to the supply voltage VCC and, on the other hand, to the emitter of the third transistor Q1 and to the collector of the fourth transistor Q2. Furthermore, the base of the third transistor Q1 is connected to the base of the fourth transistor Q2, the collector of the third transistor Q1 is connected to the emitter of the fifth transistor Q3, and the emitter of the fourth transistor Q2 is connected to the collector of the first transistor Q4. The collector of the fifth transistor Q3 is connected to earth and the base of the fifth transistor Q3 is connected to the base of the first transistor Q4.

If a current is poled to earth at the input IN, then the potential at the collector of the second transistor Q5 rises; conversely, it falls if a current is fed in from the supply voltage VCC. The signal is coupled out via an emitter follower formed by a sixth transistor Q6. The base of the sixth transistor Q6 is connected to the collector of the second transistor Q5, the collector of the sixth transistor Q6 is connected to the supply voltage VCC, and the base of a seventh transistor Q7 and a current source I2 connected to earth are connected to the emitter of the sixth transistor Q6.

The seventh transistor Q7 is earthed by its collector and the emitter, which is connected to a current source I3 connected to the supply voltage VCC forms the output OUT that provides the envelope signal EV. The seventh transistor Q7 eliminates the base-emitter voltage drop across the sixth transistor Q6 and at the same time improves the temperature response. The third transistor Q1, the fifth transistor Q3 and the seventh transistor Q7 are pnp transistors and the other transistors specified in FIG. 11 are formed by npn transistors.

Figure 12:
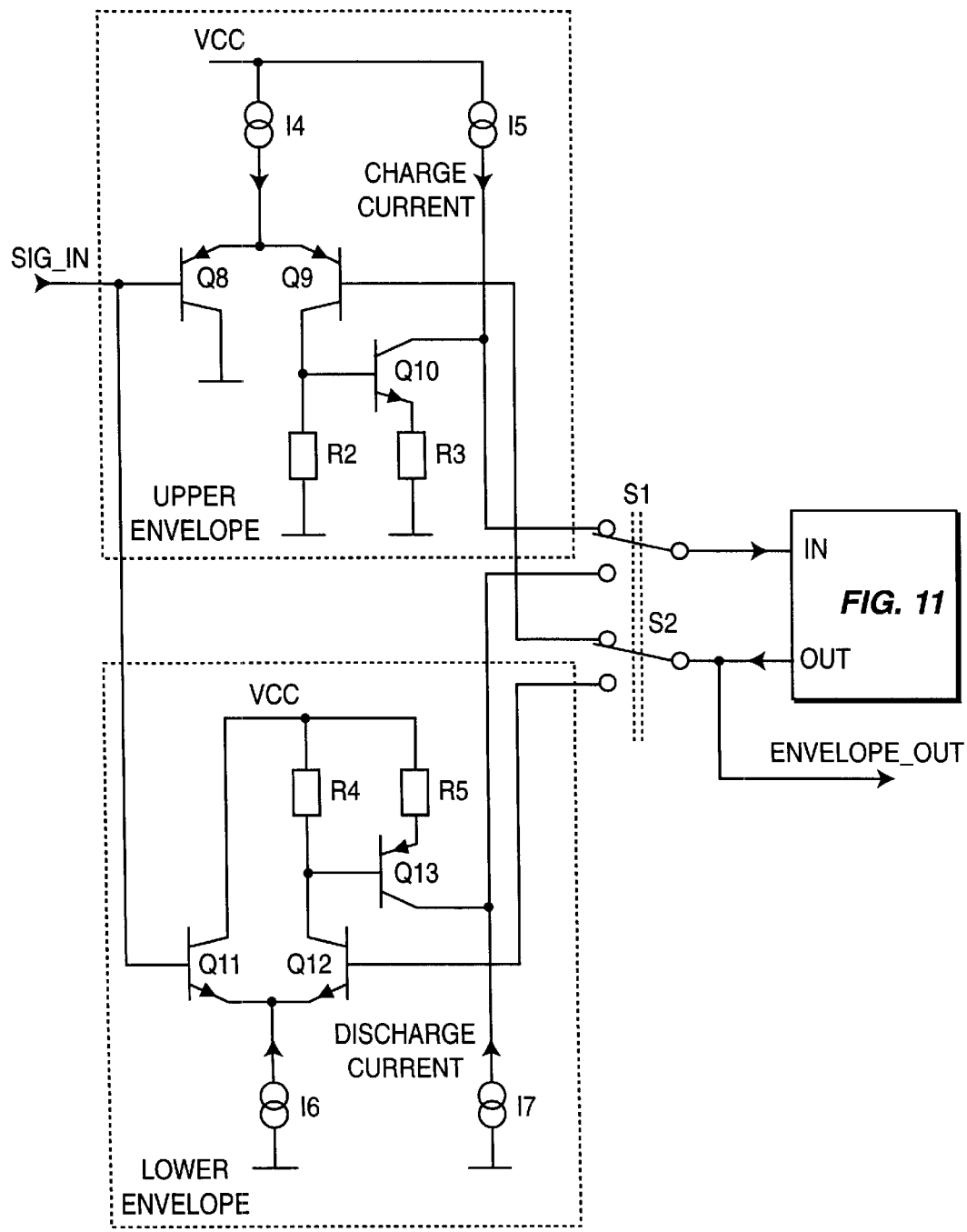
FIG. 12 shows a functional circuit diagram for the envelope detector.

The envelope detector ED which is illustrated in FIG. 11 and can provide both an upper envelope and a lower envelope is connected, in accordance with FIG. 12, to a circuit block upper envelope for the purpose of providing an upper envelope o and to a circuit block lower envelope for the purpose of providing a lower envelope u. In accordance with FIG. 12, the data signal HF is applied to a terminal SIG_IN, which is formed by the base of an eighth transistor Q8 in the circuit block upper envelope and by the base of an eleventh transistor Q11 in the circuit block lower envelope. The circuit blocks upper envelope and lower envelope constitute a charge or discharge circuit for the envelope detector ED. The envelope detector ED is illustrated as a block designated by FIG. 11 in FIG. 12, the input IN and output OUT of which block are connected to a changeover switch formed by two two-way switches S1 and S2. By means of the changeover switch, the envelope detector ED corresponding to FIG. 11 is optionally connected to the charge or discharge circuit formed by the circuit block upper envelope or to the charge or discharge circuit formed by the circuit block lower envelope, in order that a signal corresponding to the upper envelope o or to the lower envelope u is provided at the terminal Envelope_OUT.

The function of the circuit arrangement illustrated in FIG. 12 is explained using the circuit block upper envelope. The data signal HF fed to the terminal SIG_IN is compared with the signal at the output OUT of the envelope detector ED by means of a comparator. The comparator is formed by an eighth and a ninth transistor Q8, Q9. For this purpose, the emitters of the transistors Q8 and Q9 are connected to a current source I4, which is connected to a supply voltage VCC. The collector of the eighth transistor Q8 is connected to earth and the collector of the ninth transistor is connected to the base of a tenth transistor Q10 as well as to a resistor R2 connected to earth. The base of the ninth transistor Q9 is driven by the output OUT of the envelope detector. If the potential at the base of the ninth transistor Q9 is lower than that at the base of the eight transistor Q8, a current provided by the current source I4 flows through the ninth transistor Q9 and activates the tenth transistor Q10. The latter then poles a current to earth, which current is limited only by a resistor R3 connected to the emitter and the current source I1 situated within the envelope detector ED in accordance with FIG. 11. The potential at the terminal Envelope_OUT rises and rapidly follows the data signal HF at the terminal SIG_IN. If the base potential of the ninth transistor Q9 exceeds the level of the data signal HF at the terminal SIG_IN, the current provided by the current source I4 flows through the left-hand comparator path, which is formed by the eighth transistor Q8, to earth. The current which is provided by a current source I5 connected to the collector of the tenth transistor Q10 and to the supply voltage VCC and is comparatively small then discharges the capacitor C1 in the envelope detector ED in accordance with FIG. 11, as a result of which the potential at the terminal Envelope_OUT slowly decreases. The transistors which form the comparator are of the pnp type and the tenth transistor is an npn type.

The coupled two-way switches S1 and S2 enable a changeover to the lower envelope identification. The principle behind the detection is identical, except that the charging and discharging processes operate oppositely. The circuit block lower envelope, which has a structure identical to the circuit block upper envelope, is therefore constructed in a complementary manner with respect to the circuit block upper envelope. Consequently, the transistors Q11, Q12 forming the comparator in the circuit block lower envelope are of the npn type and the emitters of these transistors are connected to a current source I6 connected to earth, while the resistors R4, R5 and the collector of the transistor Q11 are connected to the supply voltage VCC. The input IN of the envelope detector corresponding to FIG. 11 is connected, via the changeover switch already mentioned, to a current source I7, which is connected to earth, and to the collector of the corresponding transistor Q13, which is a pnp type. While the current source I5 in the circuit block upper envelope drives a charge current, designated charge current in the figure, into the integrator stage corresponding to FIG. 11, the current source I6 in the circuit block lower envelope drives a discharge current, designated discharge current in the figure, into the integrator stage corresponding to FIG. 11. In general, however, the envelope signal is provided at the output OUT or Envelope_OUT and is compared with the data signal HF via the base of the transistor Q9 or transistor Q12. If the upper and lower envelopes are required at the same time, the integrator stage corresponding to FIG. 11 must be provided twice. The coupled two-way switches S1 and S2 are omitted.

If, on the other hand, only one of the envelopes should be required, either the circuit block upper envelope alone or the circuit block lower envelope alone is necessary in conjunction with the integrator stage corresponding to FIG. 11. In this case, too, the coupled two-way switches S1 and S2 are omitted. However, the invention is not restricted to the abovementioned exemplary embodiments but rather includes alterations and modifications within the scope of the inventive principle.

What is claimed is:

1. Apparatus for reproduction or recording of data or information with a photodetector and digital error signal and evaluation signal processing, comprising:
    an envelope detector formed by an integrator stage connected via a charge or discharge circuit to the photodetector; and
    an analog-to-digital converter for the audio frequency band is connected to said envelope detector for the purpose of digital evaluation signal generation.

2. Apparatus according to claim 1, wherein said is envelope detector is an analog envelope detector, which is connected to the photodetector and comprises a charge and discharge circuit connected via a switch to said integrator stage.

3. Apparatus according to claim 1 wherein said envelope signal detector is connected to the photodetector via a switch either directly or via an inverter to feed the envelope detector either a signal or the inverted signal provided by said photodetector for the purpose of forming an upper envelope or a lower envelope of a data signal detected by the photodetector.

4. Apparatus according to claim 1 wherein said envelope provides both an upper and a lower envelope of a data signal detected by the photodetector.

5. Apparatus according to claim 1 wherein the integrator stage forming the envelope detector is intended both for the purpose of providing an upper envelope and for the purpose of providing a lower envelope of a data signal detected by the photodetector.

6. Apparatus according to claim 1 wherein the charge or discharge circuit is a circuit arrangement that provides a charge current or a discharge current in conjunction with a comparator.

7. Apparatus according to claim 1, wherein said envelope detector provides both an upper and a lower envelope of a data signal of a DVD-player or DVD-recorder detected by the photodetector and is connected to an analog-to-digital converter for the audio frequency band for the purpose of digital evaluation signal generation.

8. Apparatus according to claim 1, wherein said envelope detector provides an upper or a lower envelope of a data signal of a DVD-player or DVD-recorder detected by the photodetector and is connected to an analog-to-digital converter for the audio frequency band for the purpose of digital evaluation signal generation.

9. Apparatus according to claim 1, wherein said evaluation signal is a digital mirror signal or a digital defect signal.

10. Apparatus for reproduction or recording of data or information with a photodetector and digital error signal and evaluation signal processing comprising:
    an analog envelope detector for providing at least one envelope signal of a data signal having a bandwidth upside the audio frequency band detected by the photodetector; and
    an analog-to-digital converter for the audio frequency band connected to said envelope detector for the purpose of generating a digital evaluation signal.

11. Apparatus as set forth in claim 10, wherein, said envelope detector, which provides an upper or a lower envelope of a data signal detected by the photodetector via a multiplexer is connected to an analog-to-digital converter for the audio frequency band for the purpose of generating a digital mirror signal or a digital defect signal.

12. Apparatus according to claim 10, wherein said envelope signal detector is connected to the photodetector via a switch either directly or via an inverter to feed to the envelope detector either a signal or the inverted signal provided by said photodetector for the purpose of forming an upper envelope or a lower envelope of a data signal detected by the photodetector.

13. Apparatus according to claim 10, wherein said data signal having a bandwidth upside the audio frequency band detected by the photodetector is a data signal of a DVD-player or a DVD-recorder.

14. Apparatus according to claim 10, wherein said data signal having a bandwidth upside the audio frequency band detected by the photodetector is a data signal of a CD-player or a CD-recorder.

* * * * *